(12) United States Patent
Atchison

(10) Patent No.: US 11,009,243 B2
(45) Date of Patent: May 18, 2021

(54) SYSTEMS AND METHODS FOR ZONING SYSTEM CONFIGURATION

(71) Applicant: Johnson Controls Technology Company, Auburn Hills, MI (US)

(72) Inventor: Shaun B. Atchison, Wichita, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 29 days.

(21) Appl. No.: 15/986,612

(22) Filed: May 22, 2018

(65) Prior Publication Data

US 2019/0353367 A1 Nov. 21, 2019

Related U.S. Application Data

(60) Provisional application No. 62/672,449, filed on May 16, 2018.

(51) Int. Cl.
  *F24F 11/30* (2018.01)
  *F24F 11/52* (2018.01)
  (Continued)

(52) U.S. Cl.
  CPC .............. *F24F 11/30* (2018.01); *F24F 11/52* (2018.01); *F24F 11/54* (2018.01); *F24F 11/57* (2018.01);
  (Continued)

(58) Field of Classification Search
  CPC .. F24F 11/30; F24F 11/54; F24F 11/80; F24F 11/74; F24F 11/65; F24F 11/64;
  (Continued)

(56) References Cited

U.S. PATENT DOCUMENTS 5,039,409 A * 8/1991 Blaffert .............. G01N 30/8665
                                                      210/198.2
5,605,280 A    2/1997 Hartman
(Continued)

OTHER PUBLICATIONS

Gallagher et al; Airflow System Identification Analysis for Optimizing Commercial Building VAV Settings for Improved Energy Efficiency; 2015 American Control Conference, Palmer House Hilton, Jul. 1-3, 2015, Chicago, IL, USA; pp. 276-280.

*Primary Examiner* — Thomas C Lee
*Assistant Examiner* — Charles Cai
(74) *Attorney, Agent, or Firm* — Fletcher Yoder, P.C.

(57) ABSTRACT

The techniques described herein provide systems and methods for controlling climate characteristics in a building. The control system of a climate management system may calculate a default airflow rate for each zone in the building based on a minimum permitted airflow rate of climate control equipment, a maximum permitted airflow rate of the climate control equipment, and the number of zones serviced by the climate control equipment. The control system may also adjust the default airflow rate for a zone to a customized airflow rate based on a user input. The control system may adjust the default airflow rate to the customized airflow rate if the customized airflow rate is greater than or equal to the minimum permitted airflow rate. The control system may adjust the default airflow rate to the minimum permitted airflow rate if the customized airflow rate is less than the minimum permitted airflow rate.

21 Claims, 9 Drawing Sheets

(51) Int. Cl.
*F24F 11/64* (2018.01)
*F24F 11/65* (2018.01)
*F24F 11/74* (2018.01)
*F24F 11/80* (2018.01)
*G05B 13/02* (2006.01)
*F24F 11/54* (2018.01)
*F24F 110/10* (2018.01)
*F24F 11/57* (2018.01)
*F24F 120/12* (2018.01)

(52) U.S. Cl.
CPC .............. *F24F 11/64* (2018.01); *F24F 11/65* (2018.01); *F24F 11/74* (2018.01); *F24F 11/80* (2018.01); *G05B 13/021* (2013.01); *F24F 2110/10* (2018.01); *F24F 2120/12* (2018.01)

(58) Field of Classification Search
CPC ........ F24F 11/57; F24F 11/52; F24F 2110/10; F24F 2120/12; G05B 13/021
See application file for complete search history.

(56) References Cited

U.S. PATENT DOCUMENTS

| | | | |
|---|---|---|---|
| 6,727,921 B1* | 4/2004 | Valad | G06F 3/04847 715/810 |
| 7,017,827 B2 | 3/2006 | Shah et al. | |
| 9,759,442 B2 | 9/2017 | Dietz et al. | |
| 2005/0156054 A1* | 7/2005 | Shah | F24F 3/0442 236/49.3 |
| 2006/0004492 A1* | 1/2006 | Terlson | F24F 11/30 700/276 |
| 2007/0227717 A1* | 10/2007 | McBroom | B60H 1/00735 165/203 |
| 2010/0070085 A1* | 3/2010 | Harrod | G05B 19/042 700/276 |
| 2012/0282853 A1* | 11/2012 | Sinur | F24F 13/1426 454/238 |
| 2016/0123608 A9 | 5/2016 | Karamanos et al. | |
| 2016/0209061 A1 | 7/2016 | Castillo et al. | |
| 2017/0368247 A1* | 12/2017 | Turner | A61M 1/1698 |

* cited by examiner

INDIVIDUAL ZONE AIRFLOW FOR THE BELOW ZONE(S) ARE SET LESS THAN 400 CFM.

ZONE(S) 2

IF THE INDOOR AIRFLOW IS SET LESS THAN 400 CFM, AIR CIRCULATION MAY BE REDUCED.

INDIVIDUAL ZONE AIRFLOW FOR THE BELOW ZONE(S) ARE LESS THAN THE INSTALLED EQUIPMENT'S MINIMUM AIRFLOW.

ZONE(S) 2

PLEASE UNDERSTAND THAT THIS WILL AFFECT THE SYSTEM'S PERFORMANCE AND EFFICIENCY.

SYSTEMS AND METHODS FOR ZONING SYSTEM CONFIGURATION

CROSS REFERENCE TO RELATED APPLICATION

This application claims priority from and the benefit of U.S. Provisional Application Ser. No. 62/672,449, entitled "SYSTEMS AND METHODS FOR ZONING SYSTEM CONFIGURATION," filed May 16, 2018, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and air conditioning (HVAC) system may be used to control the environmental conditions, such as temperature, within a building or other structure. A zoned HVAC system generally includes dampers in the ductwork of a building to regulate and redirect air to specific areas or zones of the building based on a cooling load in that zone. This facilitates the designation of customized temperature zones throughout the building. Zoned HVAC may also include a control system to control and/or to coordinate the operation of HVAC components, such as the dampers. As such, the control system may deliver suitably conditioned air to a zone within the building in order to adequately meet and/or approach a demand for conditioned air.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a climate management system has a control system configured to control climate characteristics in a building. The control system has a memory device and a processor. The memory device has instructions that, when executed by the processor, cause the processor to receive a minimum permitted airflow rate of climate control equipment configured to provide conditioned air to the building and a maximum permitted airflow rate of the climate control equipment, determine a number of zones serviced by the climate control equipment in the building, and calculate a default airflow rate for each zone of the number of zones based on the minimum permitted airflow rate, the maximum permitted airflow rate, and the number of zones.

In another embodiment, a climate management system has a control system configured to control climate characteristics in a building. The control system has a memory device and a processor, and the memory device has instructions that, when executed by the processor, cause the processor to receive a user input to adjust a default airflow rate for a zone of the building. The user input includes a customized airflow rate, and the default airflow rate is based on a minimum permitted airflow rate of climate control equipment, a maximum permitted airflow rate of the climate control equipment, and a number of zones serviced by the climate control equipment. The memory device also has instructions that, when executed by the processor, cause the processor to determine that the customized airflow rate is less than the minimum permitted airflow rate; and adjust the default airflow rate to be the minimum permitted airflow rate if the customized airflow rate is less than the minimum permitted airflow rate.

In another embodiment, a climate management system has a zoning system configured to control climate characteristics in a building. The zoning system has a memory device and a processor, and the memory device has instructions that, when executed by the processor, cause the processor to calculate a default airflow rate for each zone of a plurality of zones of the building. The default airflow rate is based on a minimum permitted airflow rate of heating, ventilation, and air conditioning (HVAC) equipment configured to service the plurality of zones, a maximum permitted airflow rate of the HVAC equipment, and a number of the plurality of zones. The default airflow rate is the same for each zone of the plurality of zones, and the default airflow rate is greater than or equal to the minimum permitted airflow rate.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
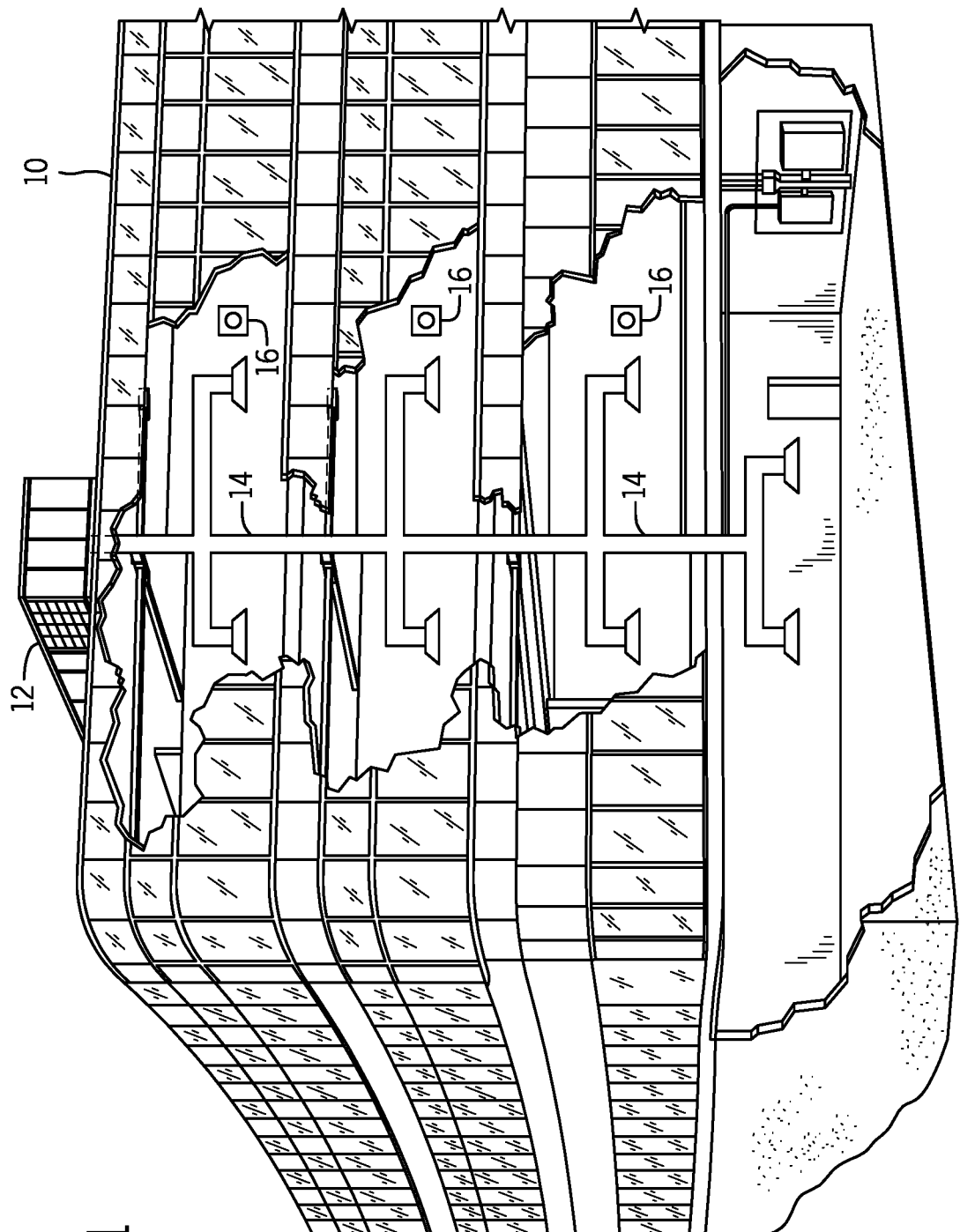
FIG. 1 is a perspective view of an embodiment of a building having a heating, ventilation, and air conditioning (HVAC) system for building environmental management that may employ one or more HVAC units, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices and/or equipment of the HVAC system. The HVAC system may be a zoned HVAC system configured to concurrently regulate separate climate conditions in separate zones of the HVAC system. For example, a controller for the HVAC system may be configured to maintain the temperature and/or humidity of each zone in a zoned system at a desired setting. During an initial configuration of a zoned HVAC system, the controller may be programmed by a homeowner or an installer to deliver conditioned air to a zone at a default airflow rate in response to a demand for conditioned air. For example, the controller may be programmed to deliver conditioned air to each zone at a default airflow rate, such as 400 cubic feet per minute (CFM).

Accordingly, the techniques described herein facilitate the dynamic adjustment of a default airflow rate for each zone of a zoned HVAC system based on the minimum airflow rate and the maximum airflow rate permitted by the equipment of the zoned HVAC system, as well as the number of zones serviced by the zoned HVAC system. Specifically, during an initial configuration of a zoned HVAC system, a control system is configured to automatically calculate a default airflow rate at which to deliver conditioned air to each zone in response to a demand for conditioned air received by the control system. The default airflow rate for each zone is based on the minimum airflow rate and the maximum airflow rate permitted by the HVAC equipment and the number of zones serviced by the HVAC system.

Additionally, the control system is configured to adjust the default airflow rate for a particular zone to a customized airflow rate based on a user input. For example, a default airflow configuration interface, such as a graphical user interface, may be configured to facilitate a user input or a user selection of a customized airflow rate for one or more zones through one or more interaction points in the default airflow configuration interface. The control system is configured to adjust the default airflow rate for the particular zone to the customized airflow rate upon determining that the customized airflow rate is greater than or equal to the minimum airflow rate permitted by the HVAC equipment. However, if the control system determines that the customized airflow rate for a particular zone is less than the minimum airflow rate permitted by the HVAC equipment, the control system is configured to adjust the customized airflow rate for the particular zone to be the minimum airflow rate permitted by the HVAC equipment. Therefore, in such circumstances, the control system is configured to provide air to the particular zone at a default airflow rate greater than the customized airflow rate selected by the user.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. The control device 16 may dynamically adjust the default airflow rate of conditioned air delivered to each zone in the HVAC system as described herein. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
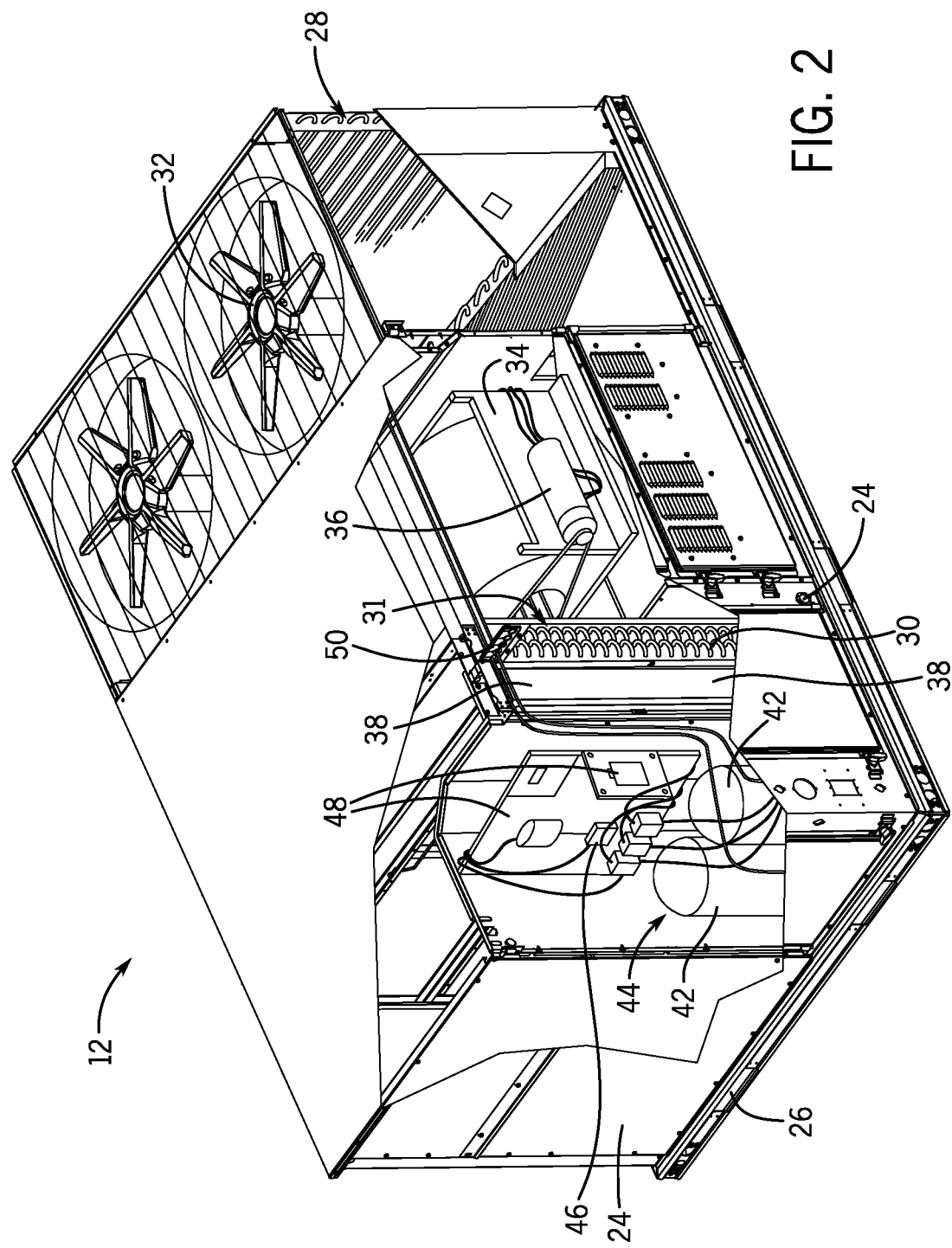
FIG. 2 is a perspective view of an embodiment of HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 may also include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
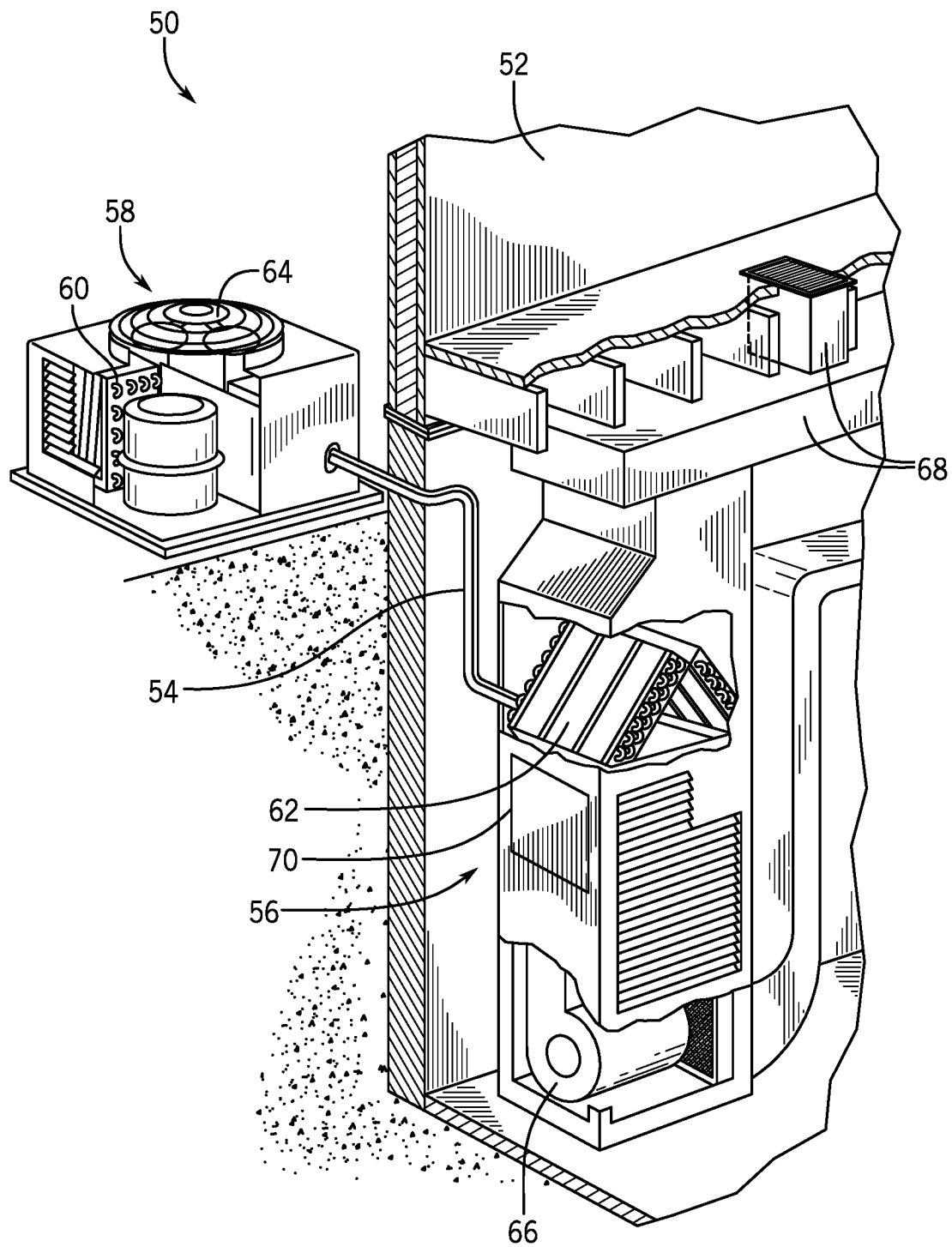
FIG. 3 is a perspective view of an embodiment of a residential heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
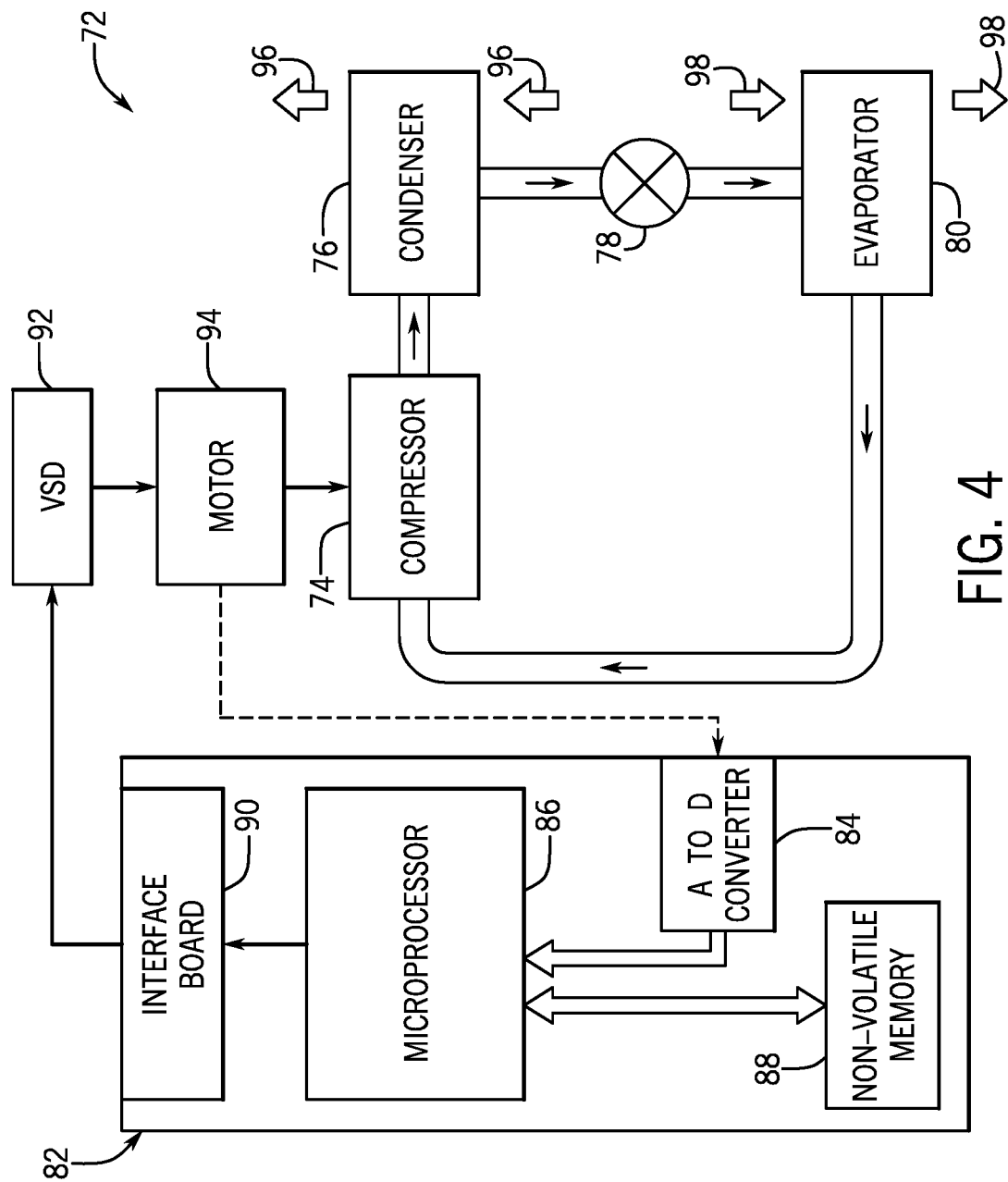
FIG. 4 is a schematic of an embodiment of a vapor compression system that may be used in the HVAC system of FIG. 1 or in the residential heating and cooling system of FIG. 3, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The embodiments of the present disclosure may include features of the description above. In particular, as will be discussed in more detail below, a control system, such as control device 16, of a zoned HVAC system may dynamically adjust a default airflow rate for each zone serviced by the zoned HVAC system. Specifically, during the configuration of a zoned HVAC system, the control system may automatically determine the default airflow rate at which to deliver conditioned air to each zone in response to a demand for conditioned air received by the control system. The default airflow rate is determined based on the minimum airflow rate and the maximum airflow rate permitted by HVAC equipment associated with the zoned HVAC system and the number of zones in the zoned HVAC system. In some embodiments, the minimum airflow rate permitted by the HVAC equipment is a highest common denominator between minimum airflow rates of each component of the HVAC equipment in the zoned HVAC system. For example, if the minimum airflow rate permitted by dampers of the zoned HVAC system is 100 CFM, and the minimum airflow rate permitted by a blower of the HVAC unit is 210 CFM, the minimum airflow rate permitted by the HVAC equipment is 210 CFM. In some embodiments, the maximum airflow rate permitted by the HVAC equipment is a lowest common denominator between maximum airflow rates of each component of the HVAC equipment in the zoned HVAC system. For example, if the maximum airflow rate permitted by the dampers of the zoned HVAC system is 1,700 CFM and the maximum airflow rate permitted by the blower of the HVAC unit is 2,500 CFM, the maximum airflow rate permitted by the HVAC equipment is 1,700 CFM. As used herein, the components of the HVAC equipment may include a blower of the HVAC unit, fans of the HVAC unit, the dampers of the zoned HVAC system, the ductwork of the zoned HVAC system, or any other component of the zoned HVAC system that has a minimum permitted airflow rate and/or a maximum permitted airflow rate.

Additionally, the control system may also be configured to adjust the default airflow rate to a customized airflow rate based on a user input. For example, a default airflow configuration interface, such as a graphical user interface, may be configured to receive a user input or a user selection of a customized airflow rate for one or more zones through one or more interaction points in the default airflow configuration interface. In some embodiments, the default airflow configuration interface is communicatively coupled to the control system via a wireless connection and/or a wired connection. The control system may then adjust the default airflow rate to the customized airflow rate upon determining that the customized airflow rate is greater than or equal to the minimum airflow rate permitted by the HVAC equipment. However, if the control system determines that the customized airflow rate selected by the user is less than the minimum airflow rate permitted by the HVAC equipment, the default airflow configuration interface may provide a notification corresponding to the determination and/or automatically adjust the default airflow rate to the minimum airflow rate permitted by the HVAC equipment instead of the customized airflow rate input by the user.

Figure 5:
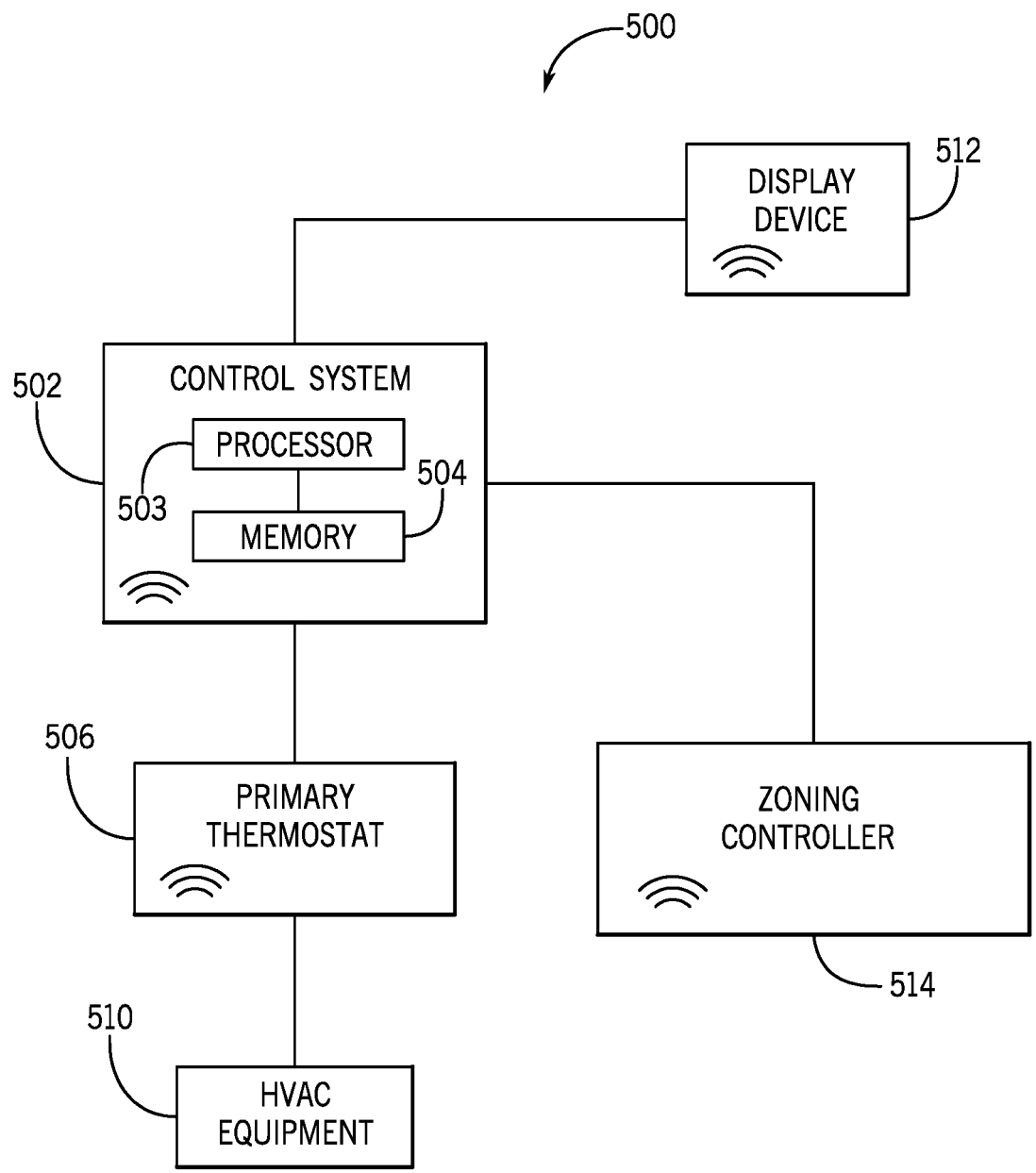
FIG. 5 is a block diagram of an embodiment of a control system communicatively coupled to a zoning controller and a primary thermostat that may be used in the HVAC system of FIGS. 1-4, in accordance with aspects of the present disclosure.

FIG. 5 is a block diagram 500 of a control system 502 communicatively coupled to a zoning controller 514 and a primary thermostat 506 that may be used in an HVAC system, such as one of the HVAC systems of FIGS. 1-4. The control system 502 has a processor 503 and a memory device 504. The processor 503 may be used to execute software, such as software for providing commands and/or data to the control system 502, and so forth. Moreover, the processor 503 may include multiple microprocessors, one or more "general-purpose" microprocessors, one or more special-purpose microprocessors, and/or one or more application specific integrated circuits (ASICS), or some combination thereof. For example, upon installation of the software or other executable instructions on the processor 503, the processor 503 may become a special purpose processor configured to improve operation of an HVAC system and the control system 502 using the techniques described herein. The processor 503 may include one or more reduced instruction set (RISC) processors. The memory device 504 may include a volatile memory, such as RAM, and/or a nonvolatile memory, such as ROM. The memory device 504 may store a variety of information and may be used for various purposes. For example, the memory device 504 may store processor-executable instructions for the processor 503 to execute, such as instructions for providing commands and/or data to the control system 502.

Additionally, the processor 503 may generate and display a default airflow configuration graphical user interface (GUI), as described herein, on a display device 512, which is communicatively coupled to the control system 502. In some embodiments, the display device 512 may be a component of the control system 502. For example, the display device 512 may be a component of a control panel screen of an HVAC unit, a zoning controller, or a thermostat. In some embodiments, the display device 512 may be an external device communicatively coupled to the control system 502. For example, the display device 512 may be a tablet, a mobile device, a laptop computer, a personal computer, a wearable device, and/or the like. The default airflow configuration GUI, via a touchscreen of the display device 512, may possess one or more different interaction points through which the user may interact with the default airflow configuration GUI. The control system may 502 may receive a user input from the display device 512. In some embodiments, the control system 502 and the display device 512 may communicate wirelessly through a communication component, as described below.

The control system 502 may be communicatively coupled to the zoning controller 514 and the primary thermostat 506 of the HVAC system. For example, the control system 502 may receive data from the zoning controller 514 that contains information related to the number of zones in the zoning layout serviced or conditioned by the HVAC system. The control system 502 may also receive identification data associated with equipment 510 in the HVAC system, such as from the primary thermostat 506, which is communicatively coupled to the HVAC equipment 510. In certain embodiments, the identification data may include a blower profile associated with a blower of an HVAC unit, which provides the control system 502 with a minimum airflow rate and a maximum airflow rate permitted by the blower of the HVAC unit. In certain embodiments, the identification data may include specification data associated with more than one component of the HVAC equipment 510, such as the blower of the HVAC unit, the fans of the HVAC unit, the dampers of the zoned HVAC system, and/or the ductwork of the zoned HVAC system. For example, the minimum airflow rate may be 100 CFM, as permitted by the ductwork of the HVAC system, and the maximum airflow rate may be 1,700 CFM, as permitted by the blower of an HVAC unit configured to condition air. In some embodiments, the control system 502 may be incorporated within the zoning controller 514, the primary thermostat 506, or an external device such as a tablet, a mobile device, or other electronic device that is utilized by a user, such as an installer, for selecting and/or determining a default airflow rate for each zone of a zoning layout of the HVAC system.

In some embodiments, the control system 502, the zoning controller 514, the primary thermostat 506, and/or the display device 512 each have a communication component that facilitates wireless communication between the control system 502, the zoning controller 514, the primary thermostat 506, and/or display device 512 via a network. The communication component may include a network interface that enables the control system 502, the zoning controller 514, the primary thermostat 506, and/or the display device 512 to communicate via various protocols such as EtherNet/IP, ControlNet, DeviceNet, or any other communication network protocol. Alternatively, the communication component may enable the control system 502, the zoning controller 514, the primary thermostat 506, and/or the display device 512 to communicate via various wired or wireless communication protocols such as Wi-Fi, mobile telecommunications technology, Bluetooth®, near-field communications technology, and the like. As such, the control system 502, the zoning controller 514, the primary thermostat 506, and/or the display device 512 may wirelessly communicate data between each other. In some embodiments, the control system 502 may be a component of the zoning controller 514, the primary thermostat 506, or any other suitable device.

In certain embodiments, the control system 502, the zoning controller 514, the primary thermostat 506, and/or the like may be referred to herein collectively as a climate management system. As such, the climate management system may dynamically adjust a default airflow rate for each zone serviced by the zoned HVAC system, and adjust the default airflow rate for a particular zone to a customized airflow rate for the particular zone based on a user input. Additionally, the climate control equipment of the climate management system may include any of the components of the HVAC equipment as described herein. For example, the climate control equipment may include the blower assembly of the HVAC unit, the fans of the HVAC unit, the dampers of the zoned HVAC system, the ductwork of the zoned HVAC system, or any other component of the zoned HVAC system.

Figure 6:
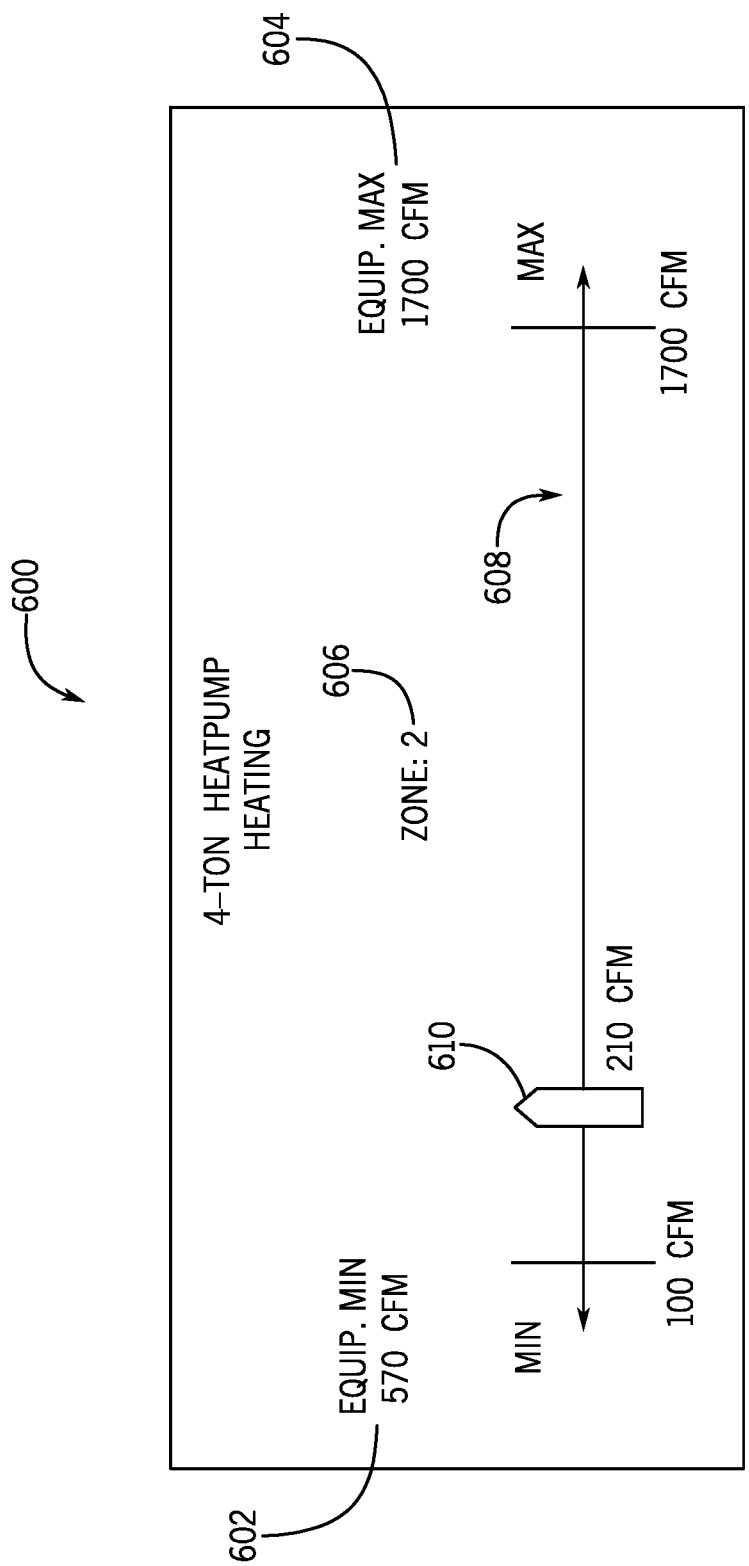
FIG. 6 is a schematic of an embodiment of a graphical user interface, illustrating a default airflow configuration for a zoned HVAC system that may be displayed by the control system of FIG. 5, in accordance with aspects of the present disclosure.

FIG. 6 is a schematic of an embodiment of a default airflow configuration graphical user interface (GUI) 600 that may be displayed by the control system 502 of FIG. 5. As described herein, the control system 502 may be configured to generate and display the default airflow configuration GUI on the display device 512 for use in selecting and/or determining a default airflow rate for each zone of a zoning layout of the HVAC system. The control system 502 may receive a user input through one or more interaction points 610 of the default airflow configuration GUI 600. As illustrated in FIG. 6, the default airflow configuration GUI 600 includes a minimum airflow rate graphic 602 and a maximum airflow rate graphic 604 for indicating the minimum airflow rate permitted by the HVAC equipment 510 and the maximum airflow rate permitted by the HVAC equipment 510, respectively. For example, the minimum airflow rate graphic 602 may indicate that the minimum airflow rate that the HVAC equipment 510 is configured to provide is 570 CFM and the maximum airflow rate that the HVAC equipment 510 is configured to provide is 1,700 CFM. The default airflow configuration GUI 600 also includes a zone indicator graphic 606 of the current zone(s) selected for configuration with the default airflow configuration GUI 600. Although the zone indicator graphic 606 of the zone is shown as a numerical value in FIG. 6, any suitable indicator may be used to indicate which zone(s) is currently selected for configuration. For example, the zone indicator 606 may include one or more numbers, characters, graphics, images, or any combination thereof.

In some embodiments, default airflow rates for more than one zone may be configured at the same time. For example, the default airflow rate associated with zones one and two of a three zone system may be configured at the same time via the default airflow configuration GUI 600. The default airflow configuration GUI 600 may also include an airflow rate slider 608 that includes a toggle 610 configured to move along the airflow rate slider 608. For example, in the illustrated embodiment, a user may input a selected or customized airflow rate for zone two by moving the toggle 610 horizontally along the airflow slider 608. Although FIG. 6 illustrates the airflow rate slider 608 as a horizontal slider, airflow rate slider 608 may be displayed in the default airflow configuration GUI 600 in any suitable shape and/or in any suitable graphic. For example, the airflow slider 608 may be displayed vertically, in a semi-circular shape, or in a semi-ellipsoidal shape. In some embodiments, the default airflow configuration GUI 600 may provide a digital keypad to input a number representing the customized airflow rate desired by the user for a particular zone. In some embodiments, the default airflow configuration GUI 600 may provide an "up" arrow and a "down" arrow to adjust the default airflow rate to a customized airflow rate.

Figure 7:
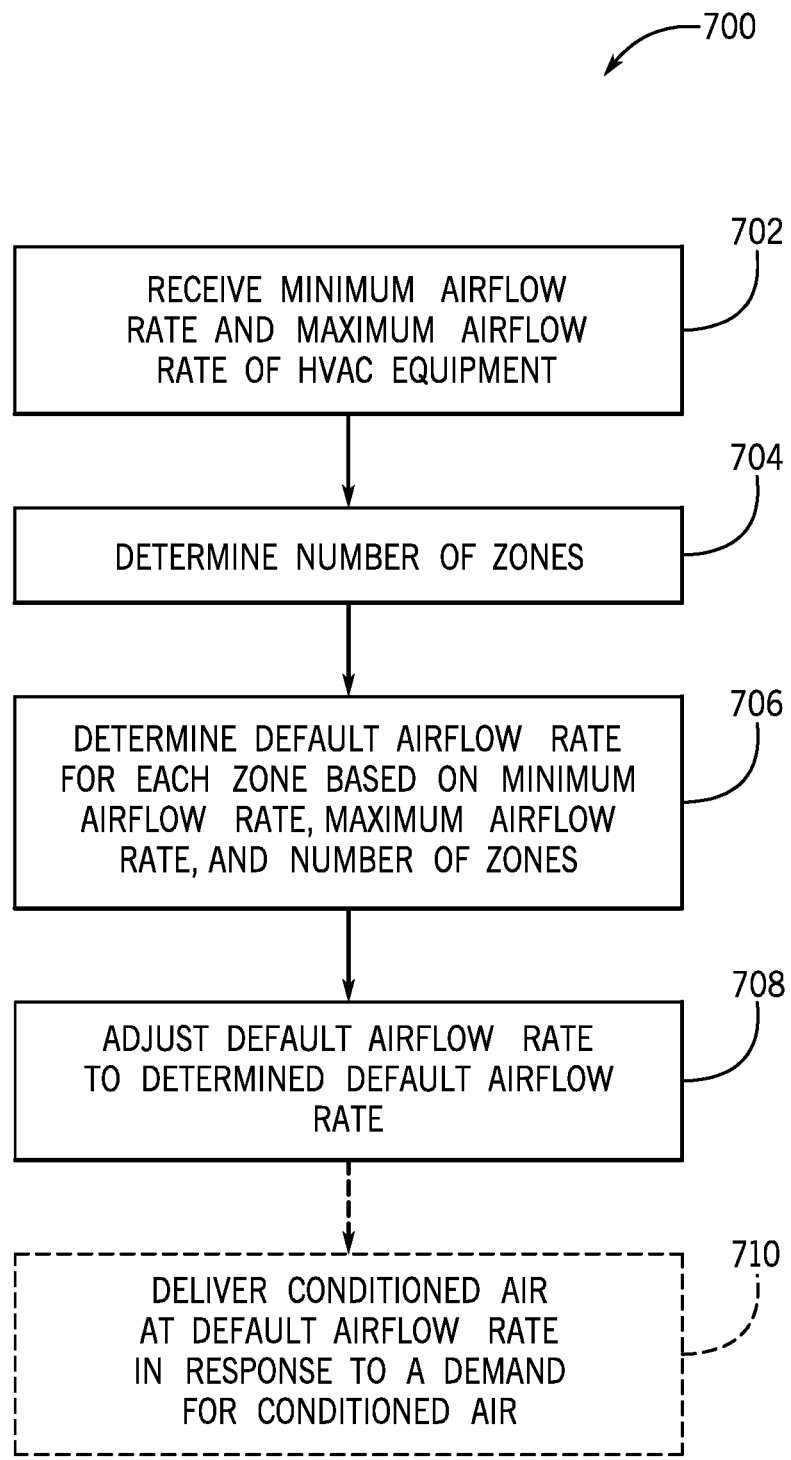
FIG. 7 is a flow diagram of an embodiment of a process for determining a default airflow rate associated with each zone in a zoned HVAC system, in accordance with aspects of the present disclosure.

FIG. 7 is a flow diagram of a process 700 for determining the default airflow rate associated with one or more zones serviced by a zoned HVAC system. Steps 702 through 708 of process 700 may be performed by the control system 502 during an initial configuration of the HVAC system as a zoned system or after resetting an existing configuration of a zoned HVAC system. In step 702, the control system 502 receives the minimum airflow rate permitted by the HVAC equipment 510 and the maximum airflow rate permitted by the HVAC equipment 510 from the primary thermostat 506. In certain embodiments, the control system 502 may receive the minimum airflow rate permitted by the HVAC equipment 510 and the maximum airflow permitted by the HVAC equipment 510 from a zoning controller, such as zoning controller 514 of FIG. 5, an external device, such as a mobile device, a tablet, or other electronic device employed by a homeowner or an installer, and/or a network or the internet. In certain embodiments, the control system 502 may access the minimum airflow rate permitted by the HVAC equipment 510 and the maximum airflow rate permitted by the HVAC equipment 510 from a memory device of the control system 502. The control system 502 may receive identification data associated with the HVAC equipment 510 from the primary thermostat 506. The identification data may include a blower profile that provides the control system 502 with the maximum airflow rate permitted by a blower of the HVAC equipment 510 and the minimum airflow rate permitted by the blower of the HVAC equipment 510. In some embodiments, the identification data may include specification data of more than one component of the HVAC equipment 510. For example, the identification data may include specification data associated with a blower of the HVAC unit, the fans of the HVAC unit, the dampers of the zoned HVAC system, and/or the ductwork of the zoned HVAC system. The specification data of each component of the HVAC equipment 510 provides the control system 502 with the maximum airflow rate permitted by each component and/or the minimum airflow permitted by each component.

In step 704, the control system 502 determines the number of zones serviced by the zoned HVAC system. In some embodiments, the control system 502 may receive data that contains the number of zones from a zone controller, such as zoning controller 514 of FIG. 5. In certain embodiments, the control system 502 may receive data that contains the number of zones from a thermostat, such as primary thermostat 506 of FIG. 5, an external device such as a mobile device, a tablet, or other electronic device employed by a homeowner or an installer, and/or a network or the internet. In some embodiments, the control system 502 may access this data from a memory device of the control system 502.

The number of zones in the zoned HVAC system may include one zone, two zones, three zones, four zones, five zones, or more zones.

In step 706, the control system 502 determines the default airflow rate for each zone serviced by the HVAC system based on the minimum airflow rate permitted by the HVAC equipment 510, the maximum airflow rate permitted by the HVAC equipment 510, and the number of zones serviced by the HVAC system. In step 708, the control system 502 then adjusts the default airflow rate to the default airflow rate calculated in step 706. In some embodiments, the default airflow rate may apply to all zones serviced by the HVAC system. In other words, the default airflow rate may be the same for all zones. In some embodiments, the control system 502 may adjust a separate default airflow rate for each zone serviced by the HVAC system. In optional step 710, the HVAC system may deliver conditioned air at the default airflow rate to one or more zones in response to a demand for conditioned air received by the control system 502. For example, after configuration of the control system 502 and the HVAC system is complete, the control system 502 may receive a request or a demand to adjust the temperature of a zone via a thermostat in the zone. The control system 502 may then transmit an output command or signal to the HVAC equipment 510 to deliver conditioned air to the zone at the default airflow rate.

Figure 8:
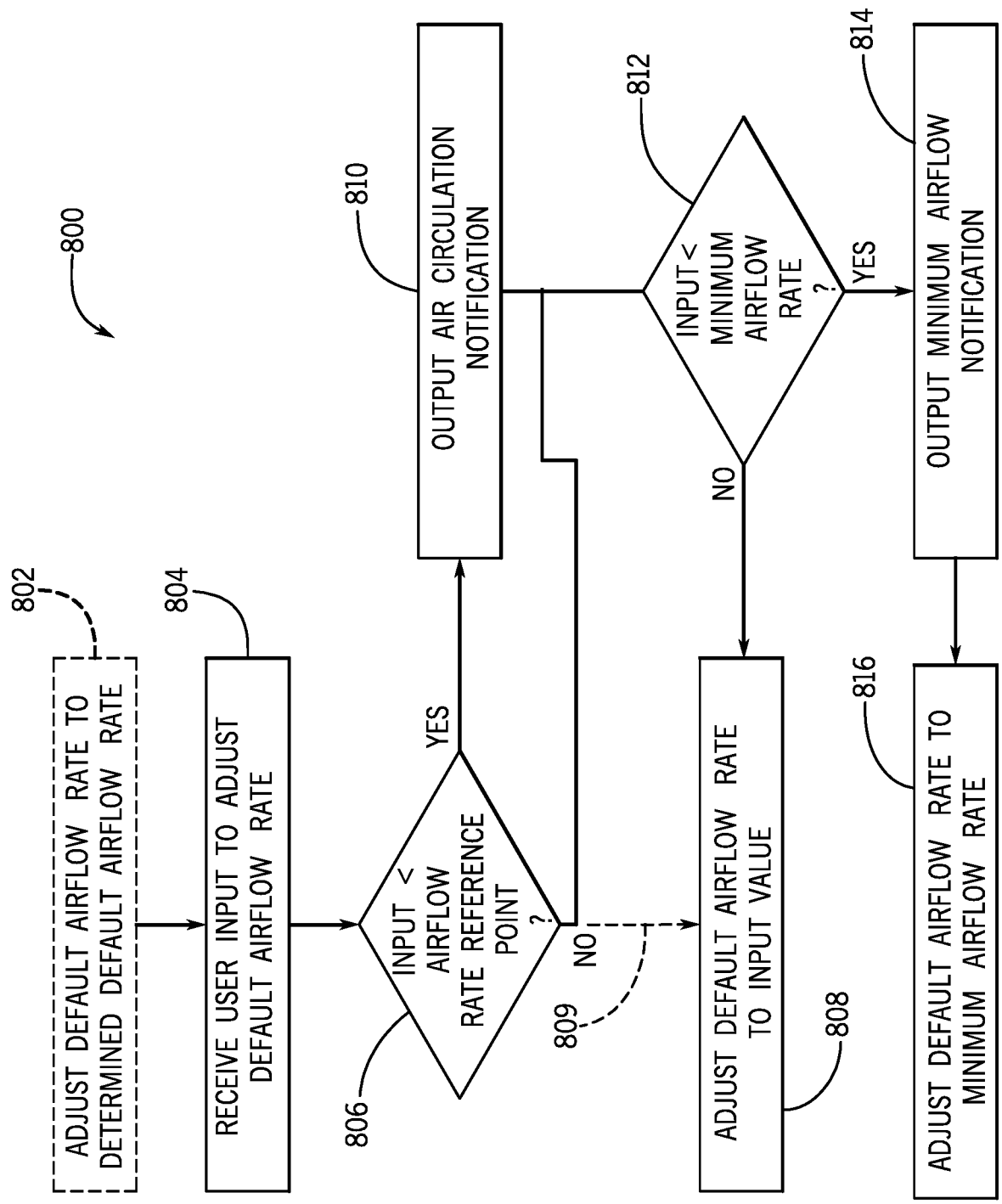
FIG. 8 is a flow diagram of an embodiment of a process for adjusting a default airflow rate in a zoned HVAC system in response to a user input, in accordance with aspects of the present disclosure.

FIG. 8 is a flow diagram of a process 800 for adjusting the default airflow rate of a zoned HVAC system in response to a user input of a customized airflow rate. In some embodiments, the default airflow rate may be automatically calculated based on certain HVAC system parameters, as described above with regard to FIG. 7. In some embodiments, the default airflow rate may be pre-configured by the manufacturers of the HVAC equipment 510 and/or the control system 502. Steps 802 through 816 of process 800 may be performed by the control system 502 during an initial configuration of the HVAC system as a zoned system or after resetting an existing configuration of a zoned HVAC system. As described above with regard to step 708 in FIG. 7, the control system 502 is configured to adjust the default airflow rate to the calculated default airflow rate for each zone based on the minimum airflow rate permitted by the HVAC equipment, the maximum airflow rate permitted by the HVAC equipment, and the number of zones serviced by the zoned HVAC system in optional step 802. In step 804, the control system 502 receives a user input to adjust the default airflow rate of the HVAC system to a customized airflow rate. In some embodiments, the user input may be received by the control system 502 through one or more interaction points via a default airflow configuration GUI, as described herein with regard to FIG. 6. In some embodiments, the control system 502 may receive a user input through physical buttons, other physical input devices, or a touch screen. For example, the user may incrementally increase the default airflow rate, such as the calculated default airflow rate described above, through an "up" button and incrementally decrease the default airflow rate through a "down" button on a zoning controller, such as zoning controller 516.

In determination step 806, the control system 502 compares the customized airflow rate associated with the user input to a pre-determined airflow rate reference point. As described herein, the pre-determined airflow rate reference point may be associated with a minimum desired or preferred airflow rate to enable sufficient, adequate, or desired air circulation within a space, such as a zone, conditioned by the HVAC system. For example, the pre-determined airflow rate reference point may be 400 CFM or any other suitable airflow rate. If the control system 502 determines that the customized airflow rate is greater than or equal to the pre-determined airflow rate reference point, the process 800 may continue to determination step 812, as described below. However, in certain embodiments, if the control system 502 determines that the customized airflow rate is greater than or equal to the pre-determined airflow rate reference point, the control system 502 may adjust the default airflow rate to be the customized airflow rate, as indicated by dashed line 809 to step 808, and the process 800 may end without proceeding to step 812. For example, the pre-determined airflow rate reference point may have a value greater than or equal to the minimum airflow rate permitted by the HVAC equipment. In such cases, the control system 502 may adjust the default airflow rate to be the customized airflow rate without comparing the customized airflow rate to the minimum airflow rate permitted by the HVAC equipment 510.

Figure 9:
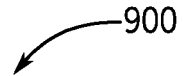
FIG. 9 is a schematic of an embodiment of a graphical user interface, illustrating a notification related to air circulation a zoned HVAC system that may be provided to a user, in accordance with aspects of the present disclosure.

If the control system 502 determines in step 806 that the customized airflow rate is less than the pre-determined airflow rate reference point, such as 400 CFM, an air circulation notification may be provided to the user. As such, in step 810, upon a determination that the customized airflow rate is less than the pre-determined airflow rate reference point, the control system 502 provides a notification to the user that adjustment of the default airflow rate to the customized airflow rate may result in reduced air circulation within the selected zone. For example, a notification, as illustrated in FIG. 9, may be displayed via the default airflow configuration GUI 600 of FIG. 6. In some embodiments, the notification may be any other suitable visual or audible indication configured to correspond to the determination that the customized airflow rate input by the user is less than the pre-determined airflow rate reference point. For example, the default airflow configuration GUI 600 may change colors, such as from green to yellow, or a speaker communicatively coupled to the control system 502 may provide a beep or other notification sound. In some embodiments, the user may choose to discard the customized airflow rate in response to the air circulation notification and select a different customized airflow rate above the pre-determined airflow rate reference point, and the process 800 may continue to determination step 812 as described below.

If the customized airflow rate input by the user is less than the pre-determined airflow rate reference point, the user, such as an installer, may elect to proceed with the customized airflow rate after the notification related to air circulation is communicated to the user, and the process 800 may continue to determination step 812 as described below. For example, the user or installer may determine that the amount of air circulation associated with the pre-determined airflow rate reference point is not demanded and/or desired for a particular zone or zones.

In determination step 812, the control system 502 is configured to compare the customized airflow rate to the minimum airflow rate permitted by the HVAC equipment 510. In some embodiments, the customized airflow rate is the customized airflow rate selected by the user in response to the air circulation notification, as described above. Upon a determination that the customized airflow rate is greater than or equal to the minimum airflow rate, the control system 502 may adjust the default airflow rate to the customized airflow rate, as indicated in step 808, and the process 800 may end.

Figure 10:
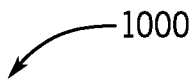
FIG. 10 a schematic of an embodiment of a graphical user interface, illustrating a notification related to system performance and efficiency in a zoned HVAC system, in accordance with an embodiment of the present disclosure.

However, if the control system 502 determines that the customized airflow rate is less than the minimum airflow rate permitted by the HVAC equipment 510, the control system 502 may provide a notification that the customized airflow rate is less than the minimum airflow rate permitted by the HVAC equipment 510. For example, a notification, as illustrated in FIG. 10, may be displayed via the default airflow configuration GUI 600 of FIG. 6 to the user. In some embodiments, the notification may be any other suitable visual or audible indication configured to correspond to the determination by the control system 502 that the customized airflow rate is less than the minimum airflow rate permitted by the HVAC equipment 510. For example, the default airflow configuration GUI 600 may change colors, such as from yellow to red, or a speaker communicatively coupled to the control system may provide a beep or other auditory signal. Thereafter, as indicated in step 816, the control system 502 is configured to adjust the default airflow rate to the minimum airflow rate permitted by the HVAC equipment 510 even though the customized airflow rate input by the user is less than the minimum airflow rate permitted by the HVAC equipment 510. In such a circumstance, any excess airflow beyond the customized airflow rate input by the user may still be supplied to the particular zone being configured instead of bled off into an adjacent zone.

In some embodiments, additional customization of the default airflow rate configuration may be enabled. For example, the user may choose to discard the customized airflow rate in response to the minimum airflow notification provided to the user in step 814 and may select a default airflow rate greater than or equal to the minimum airflow rate permitted by the HVAC equipment 510. As such, the control system 502 may be configured to adjust the default airflow rate to the new selected default airflow rate that is greater than or equal to the minimum airflow rate permitted by the HVAC equipment 510.

In some embodiments, the user may elect to proceed with the customized airflow rate that is less than the minimum airflow rate permitted by the HVAC equipment 510 in response to the minimum airflow notification provided to the user in step 814. For example, the user or the installer may determine that the amount of air circulation associated with the minimum permitted airflow rate is not demanded/desired by a particular zone and that any resulting effects to system performance and efficiency are permissible. As such, in step 816, the control system 502 may still be configured to adjust the default airflow rate to be the minimum airflow rate permitted by the HVAC equipment 510, but any airflow in excess of the customized airflow rate may be bled into adjacent zones, as the HVAC equipment 510 may be unable to provide an airflow rate less than the minimum permitted airflow rate of the HVAC equipment 510.

Although FIG. 8 illustrates steps 806 through 814 in a specific order, the order of steps 806 through 814 may be in any suitable order for the control system 502 to determine whether to adjust the default airflow rate to the customized airflow rate and to provide one or more notifications as described herein. For example, the control system 502 may perform determination steps 806 and 812 simultaneously or in an order other than described herein, and/or the control system 502 may perform steps 810 and 814 simultaneously or in an order other than described herein.

Although the preceding descriptions of processes 700, 800 are described in a particular order, which represents a particular embodiment, it should be noted that the processes 700, 800 may be performed in any suitable order. Moreover, embodiments of the processes 700, 800 may omit process blocks and/or include suitable additional process blocks. Additionally, while an HVAC system featuring a plurality of zones in a zoning layout is described above, in some embodiments, the control system 502 may be configured to determine the default airflow rate and adjust the default airflow rate to a customized airflow rate for a non-zoned HVAC system. In such embodiments, the control system 502 may generally follow processes 700, 800 to determine the default airflow rate and adjust the default airflow rate to a customized airflow rate of a non-zoned HVAC system.

FIG. 9 illustrates a notification 900 related to air circulation that may be provided to a user via the default airflow configuration GUI 600 of FIG. 6. As described above, the notification 900 may be displayed via the default airflow configuration GUI 600 in response to a determination by the control system 502 that the customized airflow rate associated with a user input is less than a pre-determined airflow rate reference point. For example, the pre-determined airflow rate reference point may be 400 CFM. The notification 900 may include a description of potential air circulation effects or consequences that may result from adjusting the default airflow to a rate less than the pre-determined airflow rate reference point. The notification 900 may also include a zone indicator 902 that represents the particular zone to which the notification 900 applies. In some embodiments, the zone indicator 902 may represent more than one zone to which the notification 900 applies. Although a numerical indicator 902 of a zone is illustrated in FIG. 9, any suitable indicator may be used to indicate the zone being configured. For example, the zone indicator 902 may include one or more numbers, characters, graphics, or any combination thereof. In some embodiments, the notification 900 may display a color that represents the determination that the customized airflow rate is less than the pre-determined airflow rate reference point. For example, the default airflow configuration GUI 600 may have a substantially green background. Upon the determination by the control system 502 that the customized airflow rate is less than the pre-determined airflow rate reference point, the green background may turn to a yellow background.

FIG. 10 illustrates a notification 1000 related to airflow below the minimum airflow rate permitted by the HVAC equipment 510 that may be provided to a user via the default airflow configuration GUI 600 of FIG. 6. As described above, the notification 1000 may be displayed via the default airflow configuration GUI 600 in response to a determination by the control system 502 that the customized airflow rate associated with a user input is less than the minimum airflow rate permitted by the HVAC equipment 510. The notification 1000 may include a description of potential effects that might be realized if the default airflow rate is adjusted to a rate less than the minimum airflow rate of the HVAC equipment 510. For example, the notification 1000 may indicate that adjustment of the default airflow rate to a rate less than the minimum airflow rate may affect the performance and the efficiency of the HVAC system.

The notification 1000 may also include a zone indicator 1002 that represents the particular zone to which the notification 1000 applies. In some embodiments, the zone indicator 1002 may represent more than one zone to which the notification 1000 applies. Although a numerical indicator 1002 of a zone is illustrated in FIG. 10, any suitable indicator may be used to indicate the zone being configured. For example, the zone indicator 1002 may include one or more numbers, characters, graphics, or any combination thereof. In some embodiments, the notification 1000 may display a color that represents the determination that the customized airflow rate is less than the minimum airflow rate permitted by the HVAC equipment 510. For example, the default airflow configuration GUI 600 may have a substantially green background. Upon the determination by the control system 502 that the customized airflow rate is less than the minimum airflow rate, the green background may turn to a red background.

As set forth above, embodiments of the present disclosure may provide one or more technical effects useful during the configuration of an HVAC system as a zoned system. For example, a control system of the zoned HVAC system is configured to calculate a default airflow rate at which to deliver conditioned air to each zone in the zoned HVAC system in response to a demand for conditioned air received by the control system. The default airflow rate for each zone is based on the minimum airflow rate permitted by the HVAC equipment, the maximum airflow rate permitted by the HVAC equipment, and the number of zones serviced by the HVAC system. Additionally, the control system is configured to adjust the default airflow rate for a particular zone to a customized airflow rate based on a user input or a user selection of a customized airflow rate for the particular zone. The control system may be configured to adjust the default airflow rate for the particular zone to the customized airflow rate upon determining that the customized airflow rate is greater than or equal to the minimum airflow rate permitted by the HVAC equipment. However, if the control system determines that the customized airflow rate for a particular zone is less than the minimum airflow rate permitted by the HVAC equipment, the control system may be configured to adjust the customized airflow rate for the particular zone to be the minimum airflow rate permitted by the HVAC equipment. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A climate management system, comprising:
a control system configured to control climate characteristics in a building, wherein the control system comprises a memory device and a processor, and wherein the memory device includes instructions that, when executed by the processor, cause the processor to:
receive, from a primary thermostat of the control system, data indicating respective minimum permitted airflow rates and respective maximum permitted airflow rates of a first component and a second component of climate control equipment configured to provide conditioned air to the building, wherein the first component or the second component is a blower;
receive additional data indicating a number of zones serviced by the climate control equipment in the building;
determine a minimum permitted airflow rate of the climate control equipment indicative of a highest value of the respective minimum permitted airflow rates of the first component and the second component;
determine a maximum permitted airflow rate of the climate control equipment indicative of a lowest value of the respective maximum permitted airflow rates of the first component and the second component;
calculate a minimum permitted zone airflow rate for each zone of the number of zones based on the minimum permitted airflow rate; and
calculate a default airflow rate for each zone of the number of zones based on the minimum permitted airflow rate, the maximum permitted airflow rate, and the number of zones, wherein the default airflow rate for each zone is the same and is greater than or equal to the minimum permitted zone airflow rate; and
deliver the conditioned air to one or more zones of the number of zones at the default airflow rate.

2. The climate management system of claim 1, comprising a zone controller of the control system, and wherein the instructions, when executed by the processor, cause the processor to receive the additional data indicating the number of zones from the zone controller.

3. The climate management system of claim 1, wherein the instructions, when executed by the processor, cause the processor to:
receive a user input indicative of an adjustment to the default airflow rate for a zone of the number of zones, wherein the user input comprises a customized airflow rate;
determine whether the customized airflow rate is greater than or equal to the minimum permitted zone airflow rate; and
adjust the default airflow rate to the customized airflow rate if the customized airflow rate is greater than or equal to the minimum permitted zone airflow rate.

4. The climate management system of claim 1, wherein the instructions, when executed by the processor, cause the processor to:
receive a user input indicative of an adjustment to the default airflow rate for a zone of the number of zones, wherein the user input comprises a customized airflow rate; and
determine whether the customized airflow rate is less than a pre-determined airflow rate reference point, wherein the pre-determined airflow rate reference point is 400 cubic feet per minute (CFM).

5. The climate management system of claim 4, wherein the instructions, when executed by the processor, cause the processor to generate a notification related to air circulation within the zone if the customized airflow rate is less than the pre-determined airflow rate reference point.

6. The climate management system of claim 1, wherein the instructions, when executed by the processor, cause the processor to:
receive a user input indicative of an adjustment to the default airflow rate for a zone of the number of zones, wherein the user input comprises a customized airflow rate;
determine whether the customized airflow rate is less than the minimum permitted zone airflow rate; and
adjust the default airflow rate to the minimum permitted zone airflow rate if the customized airflow rate is less than the minimum permitted zone airflow rate.

7. The climate management system of claim 6, wherein the instructions, when executed by the processor, cause the processor to generate a notification indicative of a determination that the customized airflow rate is less than the minimum permitted zone airflow rate.

8. The climate management system of claim 1, wherein the instructions, when executed by the processor, cause the processor to receive a user input indicative of an adjustment to the default airflow rate for a zone of the number of zones, wherein the control system comprises a thermostat and a zoning controller, and wherein the thermostat and the zoning controller are each configured to enable a user to generate the user input.

9. A climate management system, comprising:
a control system configured to control climate characteristics in a building, wherein the control system comprises a memory device and a processor, and wherein the memory device includes instructions that, when executed by the processor, cause the processor to:
receive a user input to adjust a default airflow rate for a first zone of a plurality of zones of the building, wherein the user input comprises a customized airflow rate, and wherein the default airflow rate is based on a minimum permitted airflow rate of climate control equipment, a maximum permitted airflow rate of the climate control equipment, and a number of zones serviced by the climate control equipment;
determine that the customized airflow rate is less than the minimum permitted airflow rate;
calculate a difference between the customized airflow rate and the minimum permitted airflow rate to determine a bleed airflow rate;
deliver airflow to the first zone at the customized airflow rate; and
deliver airflow to an adjacent zone of the plurality of zones of the building at the bleed airflow rate.

10. The climate management system of claim 9, wherein the instructions, when executed by the processor, cause the processor to automatically calculate the default airflow rate for each zone of the number of zones based on the minimum permitted airflow rate of the climate control equipment, the maximum permitted airflow rate of the climate control equipment, and the number of zones serviced by the climate control equipment, and wherein the default airflow rate for each zone of the number of zones is equal.

11. The climate management system of claim 9, wherein the instructions, when executed by the processor, cause the processor to generate a notification in response to the determination that the customized airflow rate is less than the minimum permitted airflow rate.

12. The climate management system of claim 11, wherein the control system comprises a display configured to output the notification, and wherein the notification comprises a visual notification, an auditory notification, or both.

13. The climate management system of claim 9, wherein the control system comprises a display, wherein the instructions, when executed by the processor, cause the processor to generate and display a default airflow configuration graphical user interface (GUI) on the display, and wherein the default airflow configuration graphical user interface (GUI) is configured to enable a user to generate the user input.

14. The climate management system of claim 13, wherein the control system comprises a thermostat having the display.

15. The climate management system of claim 13, wherein the control system comprises a zoning controller having the display.

16. The climate management system of claim 13, wherein the control system comprises a portable electronic device having the display, and wherein the portable electronic device is a mobile phone or a tablet.

17. A climate management system, comprising:
a zoning system configured to control climate characteristics in a building, wherein the zoning system comprises a memory device and a processor, and wherein the memory device includes instructions that, when executed by the processor, cause the processor to:
receive, from a primary thermostat of the zoning system, data indicating respective minimum airflow rates and respective maximum airflow rates of a first component and a second component of heating, ventilation, and air conditioning (HVAC) equipment configured to service a plurality of zones of the building, wherein the first component or the second component is a blower;
receive additional data indicating a number of the plurality of zones of the building;
determine a minimum permitted airflow rate of the HVAC equipment indicative of a highest value of the respective minimum airflow rates of the first and second components;
determine a maximum permitted airflow rate of the HVAC equipment indicative of a lowest value of the respective maximum airflow rates of the first and second components;
calculate a minimum permitted zone airflow rate for each zone of the plurality of zones based on the minimum permitted airflow rate;
calculate a default airflow rate for each zone of the plurality of zones, wherein the default airflow rate is based on the minimum permitted airflow rate, the maximum permitted airflow rate, and the number of the plurality of zones, wherein the default airflow rate is the same for each zone of the plurality of zones, and wherein the default airflow rate is greater than or equal to the minimum permitted zone airflow rate; and
deliver airflow to one or more zones of the plurality of zones at the default airflow rate.

18. The climate management system of claim 17, wherein the zoning system comprises a zoning controller, wherein the instructions, when executed by the processor, cause the processor to receive the number of the plurality of zones from the zoning controller.

19. The climate management system of claim 18, wherein the zoning controller is configured to receive user input indicative of an adjustment to the default airflow rate for a zone of the plurality of zones, wherein the adjustment comprises a customized airflow rate, and wherein the instructions, when executed by the processor, cause the processor to:
- compare the customized airflow rate to the minimum permitted zone airflow rate; and
- generate a notification to output via the zoning controller if the customized airflow rate is less than the minimum permitted zone airflow rate.

20. The climate management system of claim 17, wherein the primary thermostat is configured to receive user input indicative of an adjustment to the default airflow rate for a zone of the plurality of zones, wherein the adjustment comprises a customized airflow rate, and wherein the instructions, when executed by the processor, cause the processor to:
- compare the customized airflow rate to the minimum permitted zone airflow rate; and
- generate a notification to output via the primary thermostat if the customized airflow rate is less than the minimum permitted zone airflow rate.

21. The climate management system of claim 20, wherein the primary thermostat comprises a touchscreen display, and wherein the instructions, when executed by the processor, cause the processor to generate and display, on the touchscreen display, a default airflow configuration graphical user interface (GUI) configured to receive the user input.

* * * * *